United States Patent
Lehto et al.

(10) Patent No.: US 9,333,568 B2
(45) Date of Patent: May 10, 2016

(54) MILLING TOOL AS WELL AS A MILLING INSERT

(71) Applicant: SANDVIK INTELLECTUAL PROPERTY AB, Sandviken (SE)

(72) Inventors: Ralf Lehto, Gävle (SE); Per Viklund, Gävle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 419 days.

(21) Appl. No.: 13/742,497

(22) Filed: Jan. 16, 2013

(65) Prior Publication Data

US 2014/0030034 A1    Jan. 30, 2014

(30) Foreign Application Priority Data

Jan. 16, 2012 (SE) ........................................ 1250021

(51) Int. Cl.
  *B23C 5/06* (2006.01)
  *B23C 5/22* (2006.01)
  *B23C 5/20* (2006.01)

(52) U.S. Cl.
  CPC ............ *B23C 5/2247* (2013.01); *B23C 5/06* (2013.01); *B23C 5/205* (2013.01); *B23C 5/2221* (2013.01); *B23C 2200/045* (2013.01); *B23C 2200/164* (2013.01); *B23C 2200/168* (2013.01); *B23C 2200/206* (2013.01); *B23C 2200/283* (2013.01); *B23C 2210/168* (2013.01); *Y10T 407/192* (2015.01); *Y10T 407/20* (2015.01); *Y10T 407/23* (2015.01)

(58) Field of Classification Search
  CPC .................. Y10T 407/1924; Y10T 407/1932; Y10T 407/23; B23C 5/2221; B23C 5/2243; B23C 5/2247; B23C 2200/045; B23C 2200/081; B23C 2200/083; B23C 2200/161; B23C 2200/168; B23C 2200/206
  USPC ............................................... 407/113, 42, 46
  See application file for complete search history.

(56) References Cited

U.S. PATENT DOCUMENTS

| | | | |
|---|---|---|---|
| 7,198,437 B2 * | 4/2007 | Jonsson | ......................... 407/115 |
| 2008/0232912 A1 * | 9/2008 | Bhagath | ........................ 407/114 |
| 2010/0054873 A1 | 3/2010 | Men | |
| 2011/0013997 A1 | 1/2011 | Pokolm | |
| 2011/0103905 A1 | 5/2011 | Morrison | |
| 2012/0070239 A1 * | 3/2012 | Park et al. | ........................ 407/42 |
| 2012/0251250 A1 * | 10/2012 | Morrison et al. | ............... 407/42 |

FOREIGN PATENT DOCUMENTS

DE    102006023740 A1    11/2007
DE    102006025293 A1    12/2007

(Continued)

*Primary Examiner* — Sunil K Singh
*Assistant Examiner* — Alan Snyder
(74) *Attorney, Agent, or Firm* — Corinne R. Gorski

(57) ABSTRACT

A double-sided, indexable milling insert has a round basic shape defined by an imaginary cylinder, which is concentric with a center axis and extends between two reference planes that extend perpendicular to the center axis and are equidistantly separated from a neutral plane. The milling insert includes a pair of opposite chip faces located in the reference planes between which an envelope surface concentric with the center axis extends, a plurality of identical and alternately usable cutting edges along the peripheries of the chip faces, and lock means for rotationally securing the milling insert in one of several predetermined index positions. The individual cutting edge has the shape of a wave trough and includes two edge segments that meet at a bottom point.

12 Claims, 12 Drawing Sheets

(56) References Cited

FOREIGN PATENT DOCUMENTS

Figure 1:
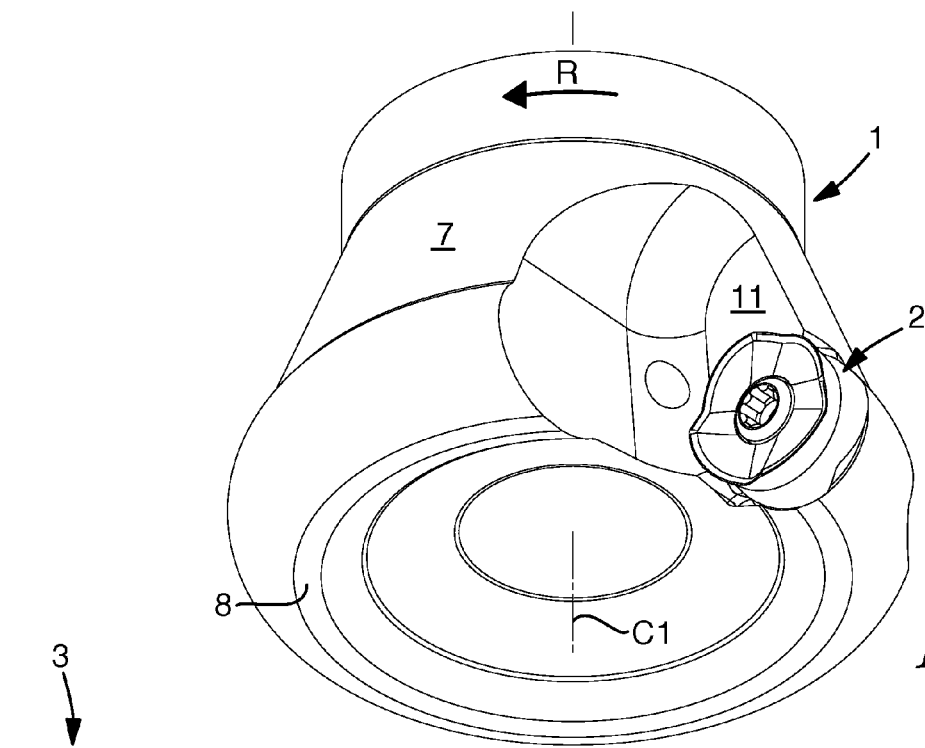

| | | | |
|---|---|---|---|
| EP | 2412464 | A1 | 2/2010 |
| EP | 2198997 | A2 | 6/2010 |
| JP | S6239106 | A | 2/1987 |
| WO | 2010017859 | A1 | 2/2010 |

\* cited by examiner

MILLING TOOL AS WELL AS A MILLING INSERT

RELATED APPLICATION DATA

This application claims priority under 35 U.S.C. §119 to Swedish Patent Application No. 1250021-1, filed on Jan. 16, 2012, which the entirety thereof is incorporated herein by reference.

TECHNICAL FIELD OF THE INVENTION

In a first aspect, this invention relates to a milling tool of the type that comprises, on one hand, a basic body that includes front and rear ends, between which there extends a centre axis on which the basic body is rotatable and with which a rotationally symmetrical envelope surface is concentric, as well as a seat situated in a transition between the envelope surface and the front end, and on the other hand a double-sided, indexable milling insert, which has a round basic shape defined by an imaginary cylinder that is concentric with a centre axis and extends between two reference planes that extend perpendicular to the centre axis, and which comprises a pair of opposite chip faces, which are located in said reference planes and between which a circumferential envelope surface concentric with the centre axis of the milling insert extends, as well as a plurality of identical and alternately usable cutting edges along the periphery of the individual chip face, the seat being located in the basic body in a tipped-in spatial position in which an axial tipping-in angle as well as a radial one are negative with the purpose of providing a clearance behind an active cutting edge of the milling insert, and the milling insert being clamped in the seat by means of a tightening device and rotationally secured in one of several index positions by means of co-operating securing means of the basic body and the milling insert, respectively.

In a further, vital aspect, the invention also relates to a double-sided, indexable milling insert as such.

BACKGROUND OF THE INVENTION AND PRIOR ART

Within many areas for chip-removing or cutting machining of metal, including milling, it is desirable that the replaceable milling inserts included in the tools should be strong, have a long service life, provide efficient chip removal, as well as—not the least—include as many usable cutting edges as possible for the application in question. Therefore, within the field of milling, round and double-sided milling inserts are suitable not only in so far as a plurality of cutting edges or cutting edge sections can be formed along each one of the peripheries of the two chip faces, but also in so far as corner-free milling inserts are considerably stronger and more durable than such polygonal milling inserts in which each cutting edge ends in a more or less fragile corner.

Round and double-sided milling inserts, e.g. of the type disclosed in US 2011/0103905 A1 and WO 2010/017859 A1, require, in order to guarantee clearance behind the active chip-removing cutting edge, that the appurtenant seat in the basic body is located in a special so-called tipped-in spatial position in which both an axial tipping-in angle and a radial one are negative, contrary to the positive tipping-in angles that are possible when the milling inserts are single sided and formed with a positive cutting geometry. Generally, negative cutting edges are more blunt-cutting than positive, among other things as a consequence of the material to be removed being pushed in front of the milling insert in the direction of rotation, rather than being lifted out by wedge action, as is the case with positive cutting edges. Disadvantages of previously known double-sided milling inserts having a round basic shape are, therefore, among other things that the chip formation may become difficult to master and that the milling operations produce rough and high sounds; this is something that creates a poor working environment in the plant in question. A further shortcoming of previously known milling tools having round, double-sided milling inserts is the fact that ramping operations cannot be successfully carried out because the envelope so surface of the milling insert, as a consequence of the negative tipping-in position of the milling insert, will collide with the generated surface as soon as a considerable axial feed, in addition to the traditional rectilinear one in planes perpendicular to the rotation axis of the tool, is applied to the tool.

Terminology

Before the invention is described in more detail, in order to provide conceptual clarity, certain fundamental concepts vital to the understanding of the invention should be made clear, and which may vary depending on if they only relate to the shape of the basic body of the tool and of the milling insert, respectively, or to the functions thereof in operation. When a feature for instance is described as "nominal", the same only relates to the milling insert as such, i.e., without coupling to the basic body of the tool, but if the same is denominated "functional", the same relates to the assembled state of the tool, i.e., with the milling insert mounted in the seat of the basic body. The concept "chip face" relates to any end of the milling insert between which a circumferential envelope surface extends. The individual chip face may either form an upper side or an under side in its mounted state in the seat of the basic body. In each chip face, there are included a plurality of part surfaces closest to each cutting edge. Henceforth, said part surfaces are denominated "chip surfaces". Furthermore, the concept "slope angle" relates to the angle at which each one of two edge segments included in the individual cutting edge leans in relation to a reference plane that is touched by the highest situated end points between which the cutting edges extend. In the subsequent text, also the concepts "invertible" and "indexable", respectively, are found. When the milling insert according to the invention is "inverted", this means that a previously upwardly exposed chip face is turned downward toward a tangential support surface or bottom in the seat with the purpose of exposing the other chip face upward. When the milling insert is "indexed", this means that the same—after detachment—is rotated a bit on its own centre axis and then again is fixed in the seat. The object of inversion as well as indexing of the milling insert is, in the usual way, to change into an unused cutting edge, when a previously active cutting edge has been worn out, wherein each individual cutting so edge should assume one and the same spatial position in relation to the basic body.

OBJECTS AND FEATURES OF THE INVENTION

The aim of providing a milling insert—intended for the milling tool in question—which obviates the disadvantages of previously known milling inserts and is of the double-sided type having a round basic shape, forms the basis of the invention. Therefore, a primary object of the invention is to provide a round, double-sided milling insert that, in spite of its negative tipped-in spatial position in the basic body, allows a functionally positive cutting process, i.e., a cutting process during which the active cutting edge by wedge action splits and lifts out the chips from the generated surface, more precisely with the purpose rendering the cutting edge easy-cutting while minimising the generated sound level and assuring a good chip formation. A further object is to provide a milling insert that makes the milling tool usable for ramping operations at ample ramping angles. In addition, the invention aims at providing a milling insert that can be formed with cutting edges that allow efficient milling at comparatively large cutting depths. Yet an object of the invention is to provide a milling insert that in a simple and cost-effective way can be manufactured with securing means that, in co-operation with homologous securing means in the seat of the basic body, efficiently counteract tendencies of the milling insert to rotate.

According to the invention, at least the primary object is attained by the individual cutting edge of the milling insert being given the shape of a wave trough, which is lowered from an adjacent reference plane when the milling insert is regarded in side elevation, and being formed with two edge segments, which transform into each other via a bottom point and a primary edge segment of which is longer than a secondary one and falls toward the bottom point at a slope angle that is smaller than a corresponding slope angle at which the secondary edge segment falls toward the bottom point. In such a way, a functionally positive cutting process is obtained, in spite of the milling insert, in its mounted state, being tipped-in into a position wherein the axial tipping-in angle as well as the radial one are negative in order to provide good clearance.

In one embodiment of the invention, the milling insert is formed in such a way that a clearance surface included in the envelope surface thereof and located adjacent to at least the secondary edge segment deviates from an imaginary cylinder, which defines the round shape of the milling insert, more precisely in the direction from the secondary edge segment toward the neutral plane. In such a way, ramping operations are allowed without the clearance surface colliding with the material of the workpiece.

With the purpose of further improving the possibilities of a problem-free ramping, the milling insert may be formed with a waist, which is located in the neutral plane thereof and from which circumferential clearance surfaces diverge toward the periphery of the chip faces. In such a way, efficient clearance surfaces will be present not only adjacent to the secondary edge segments of the cutting edges, but also adjacent to the primary edge segments. In other words, efficient clearance is obtained along the entire length of the individual cutting edge.

In one embodiment, the primary edge segment, as viewed in plane elevation, is given an arc length that amounts to at least 60% of the total arc length of the cutting edge. An advantage of this embodiment is that the milling insert can operate at relatively large cutting depths while maintaining its easy-cutting and auditory advantageous properties.

In one embodiment, the first edge segment is given an arc length that amounts to at most 85% of the total length of the individual cutting edge. In such a way, the cutting edges can be formed with a design suitable for large cutting depths without the wave troughs of the milling insert becoming too deep. This contributes to give the milling insert an overall good strength.

In one embodiment of the invention, the cutting edges along one chip face is rotation-angularly displaced at an acute arc angle in relation to the cutting edges along the other chip face. In such a way, the advantage is obtained that the milling insert obtains as even a thickness as possible while guaranteeing optimum bulk strength, in spite of the wave trough-like shape of the cutting edges. By mutually displacing the two sets of cutting edges of the milling insert at a suitable arc angle in relation to each other, the ramping possibilities are in addition improved further, more precisely milling with large ramping angles.

In one embodiment, the means, which are required for rotationally securing the milling insert in the appurtenant seat, are located in each one of the two opposite chip faces of the milling insert. In such a way, the designer gets the freedom to form the envelope surface of the milling insert in the best way, i.e., without loading the envelope surface with such means. By placing the rotational-securing means in the chip faces, in addition, the advantage is obtained that the shape of the cutting edges can be utilized to readily provide securing means having a topographic shape that prevents rotation of the milling insert.

In one embodiment, a connecting surface for rotational securing formed in each chip face may be separated from a continuous cutting edge line along all cutting edges, via a comparatively thin, endless chip surface. In such a way, the chip surfaces can be formed without dependence on the topographic shape of the chip face being inside. Among other things, the rake angle of the cutting edge can be made uniform along the length of the cutting edge.

BRIEF DESCRIPTION OF THE APPENDED DRAWINGS

Figure 2:
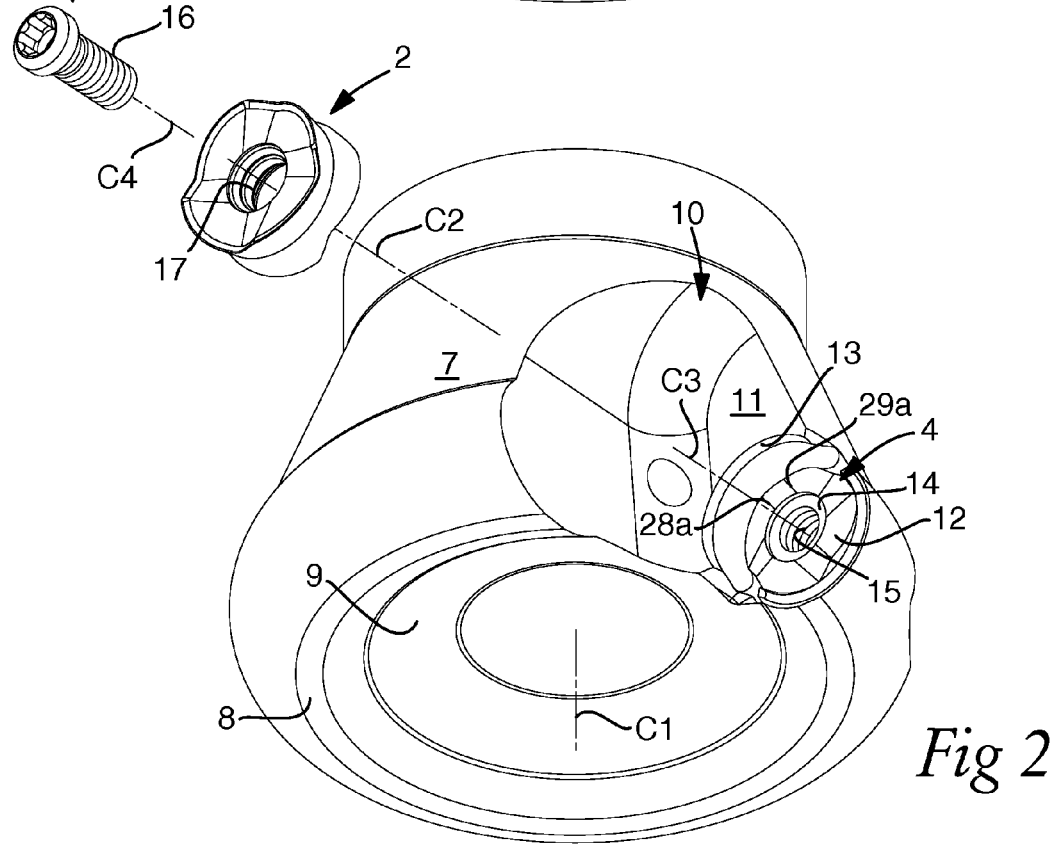
Figure 3:
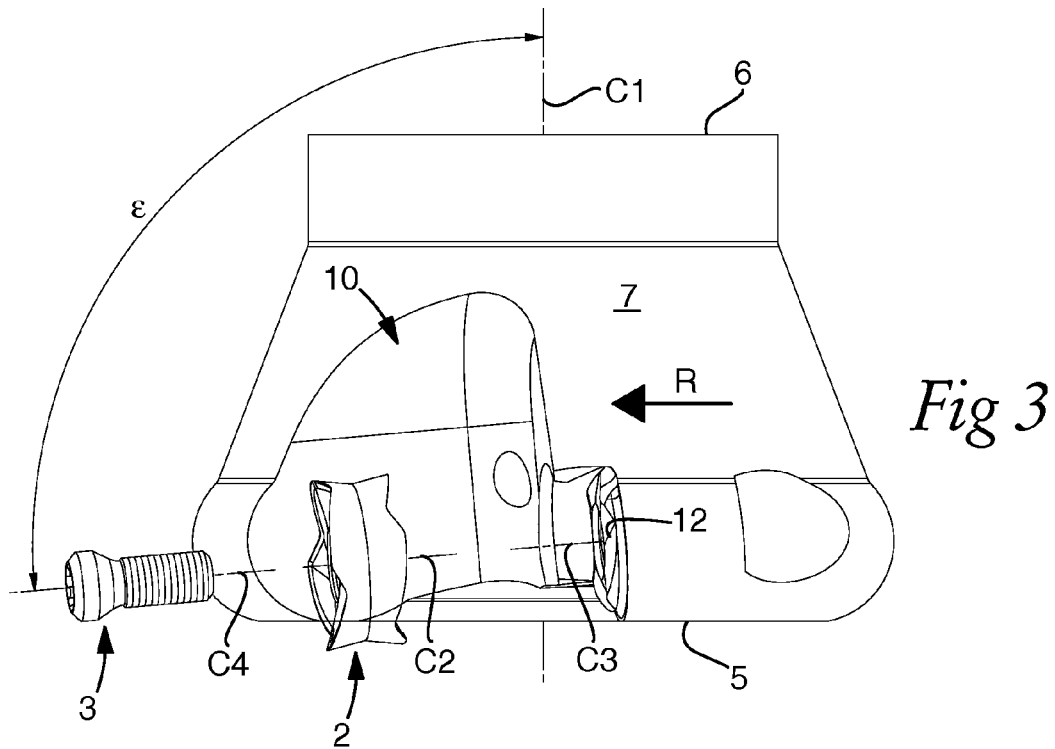
Figure 4:
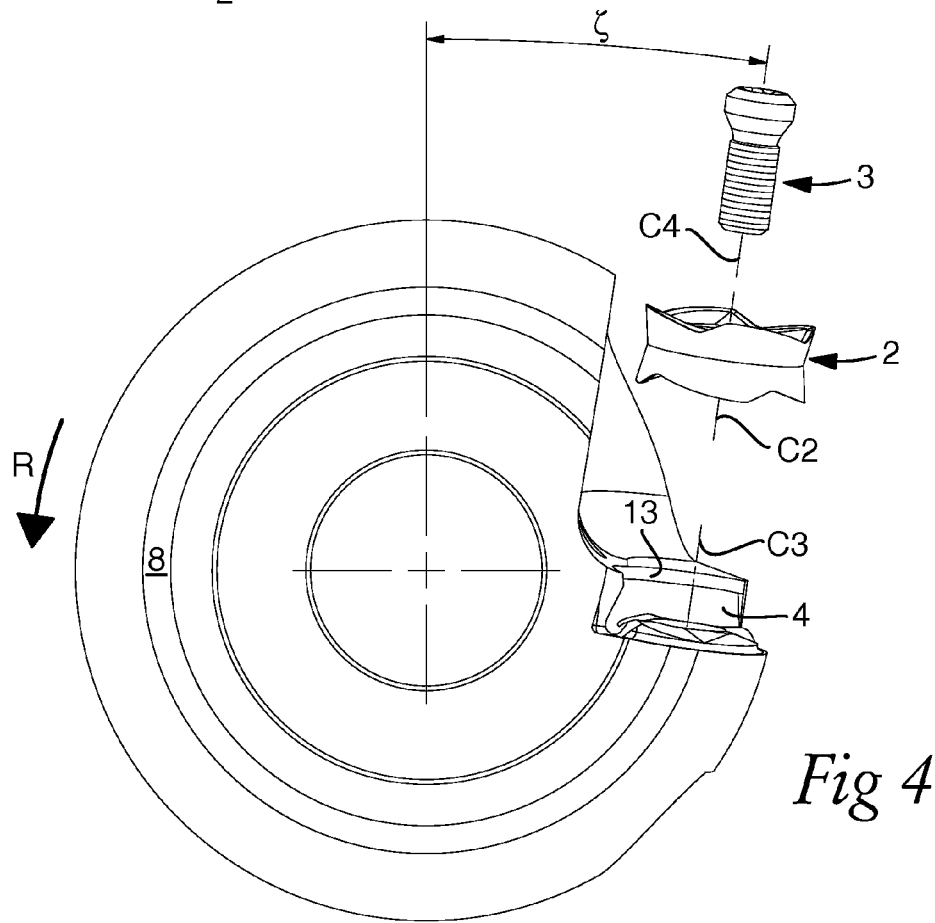
Figure 5:
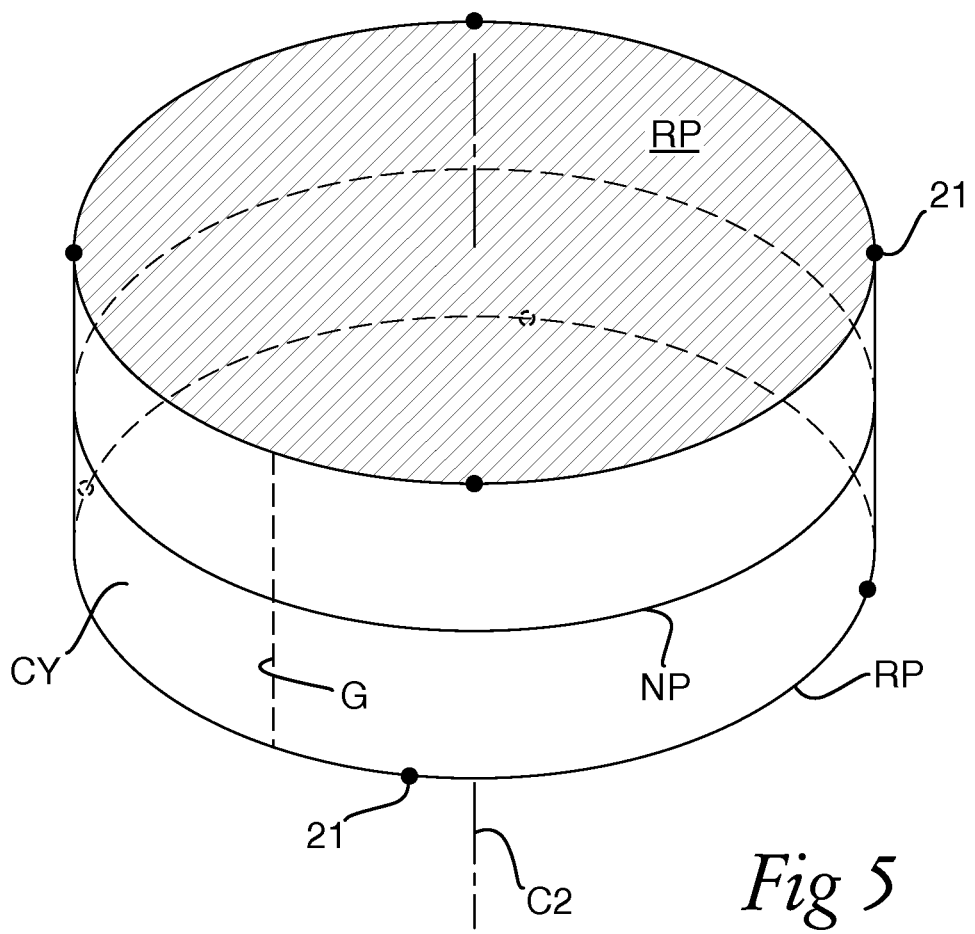
Figure 6:
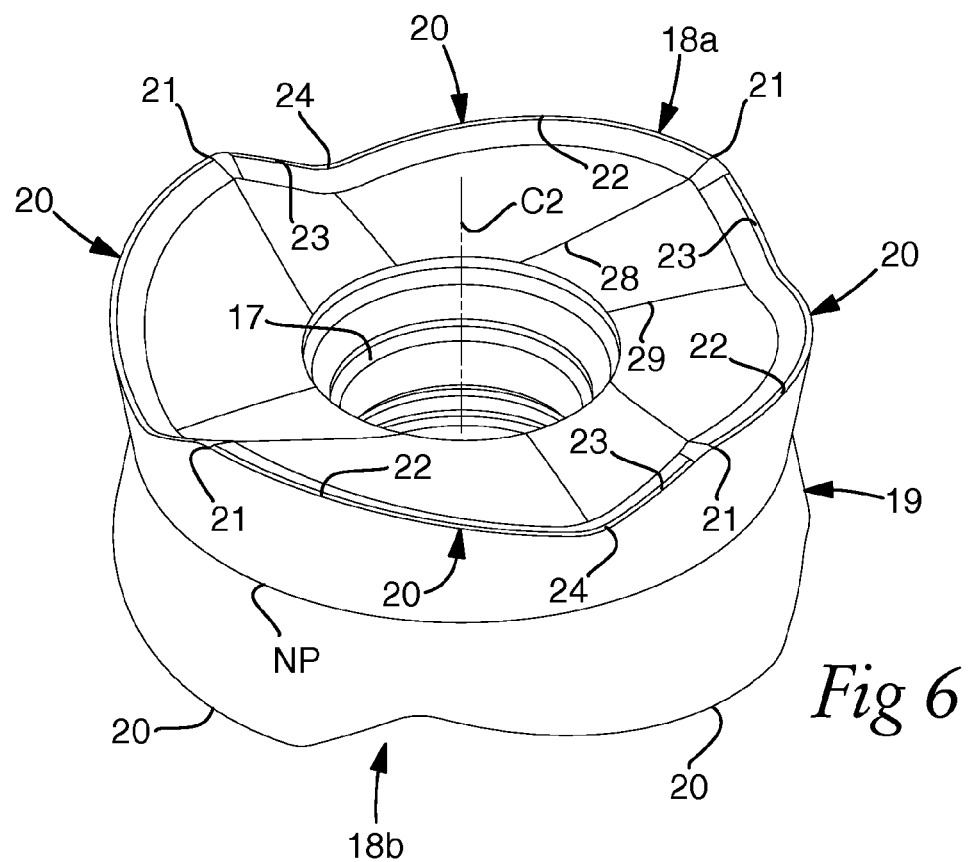
Figure 7:
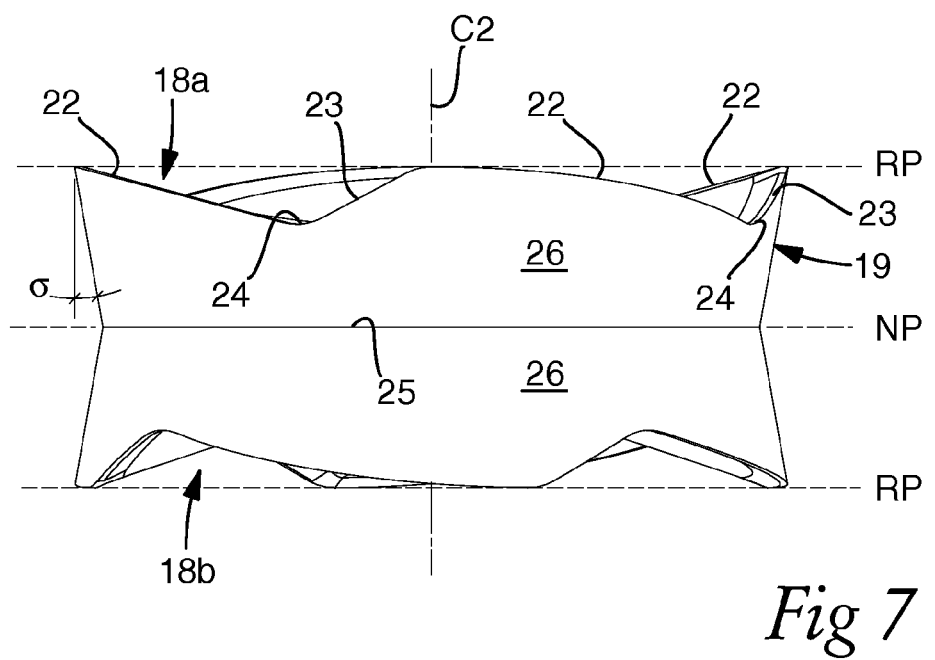
Figure 8:
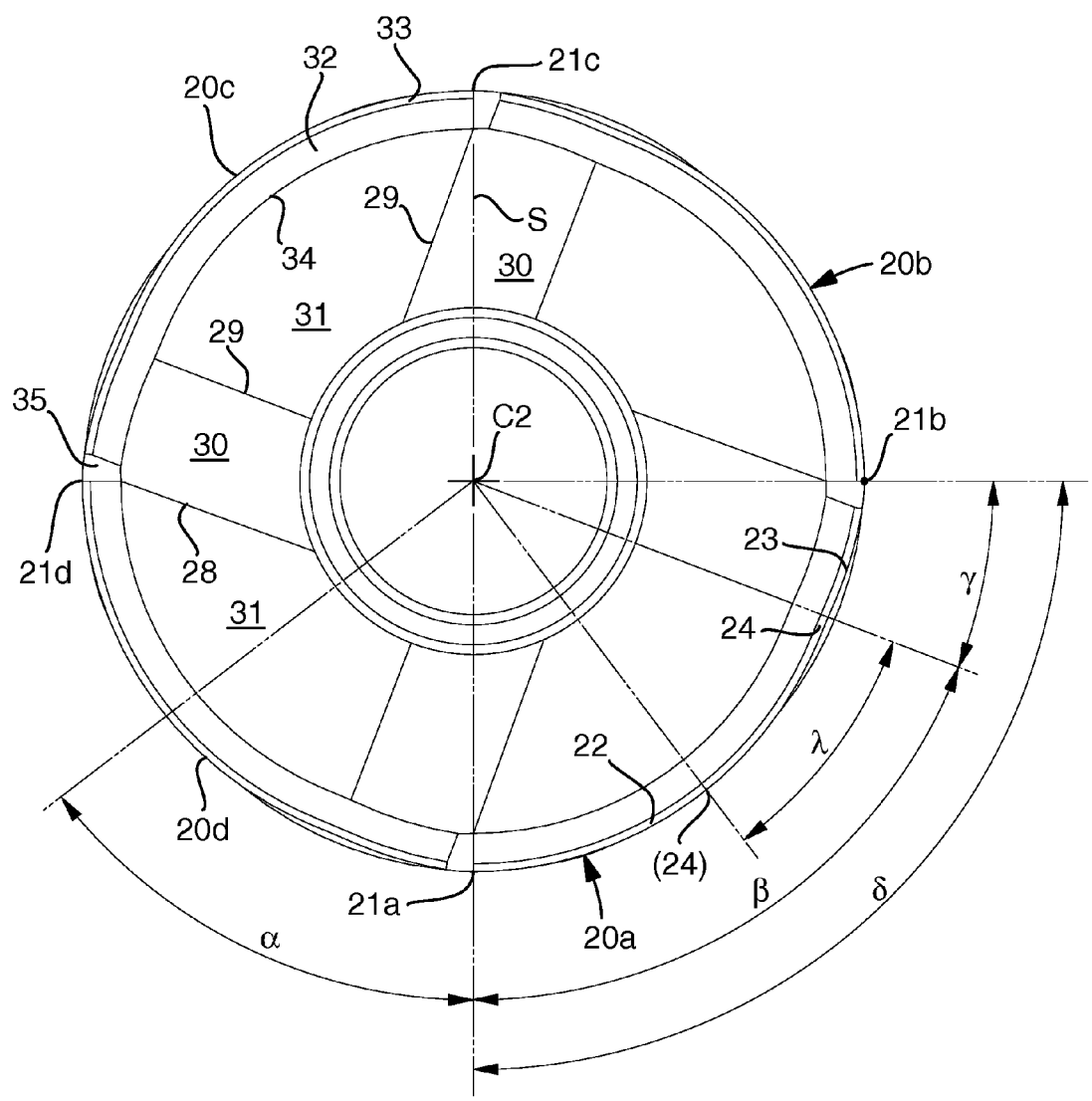
Figure 9:
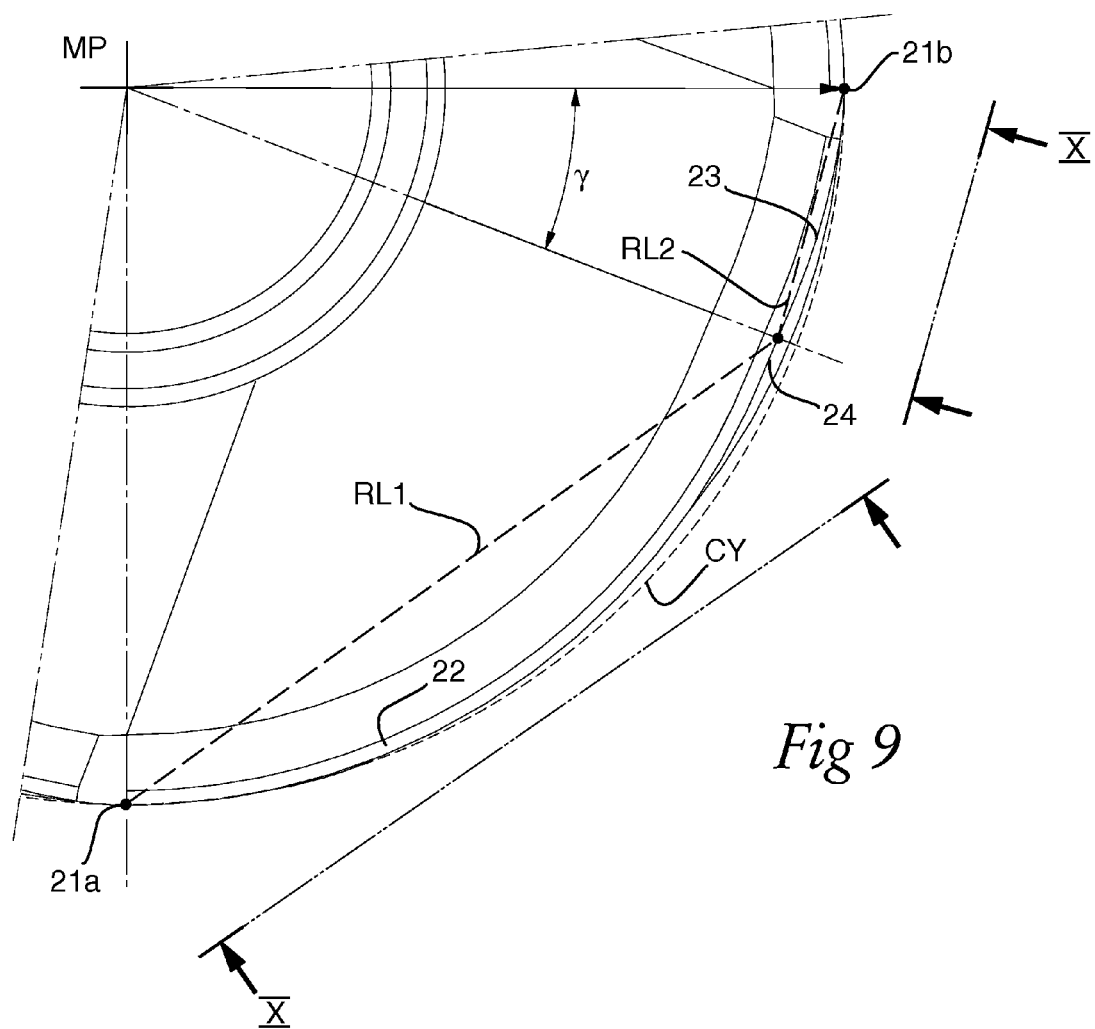
Figure 10:
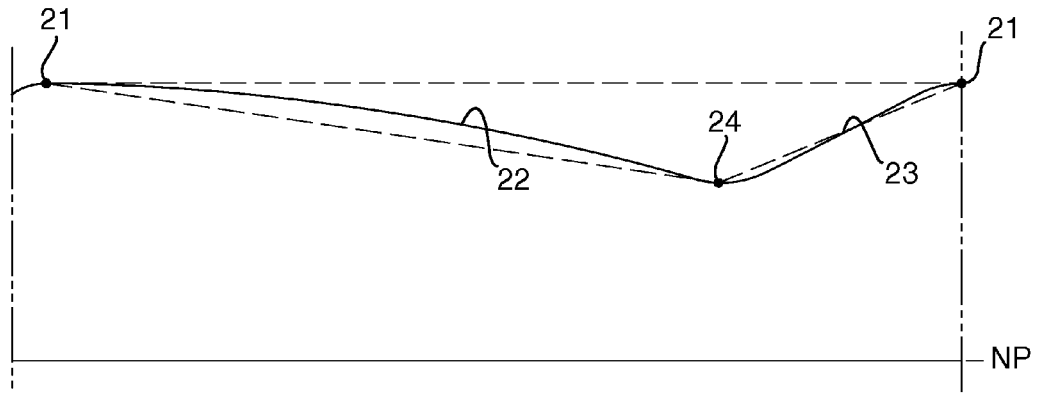
Figure 11:
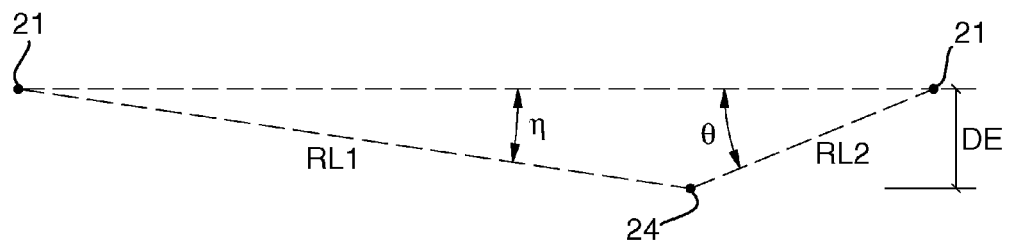
Figure 12:
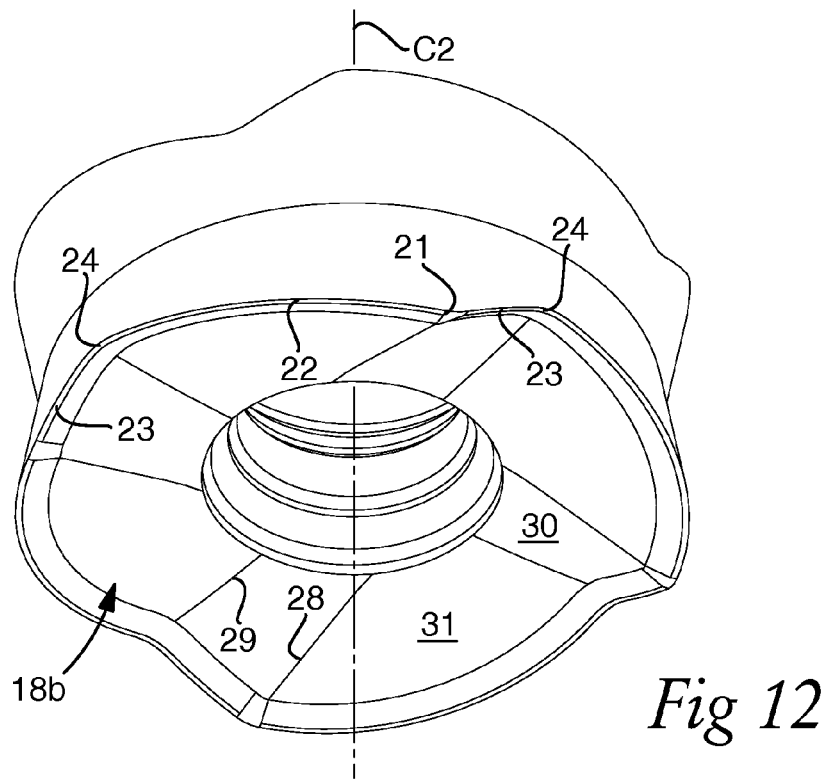
Figure 13:
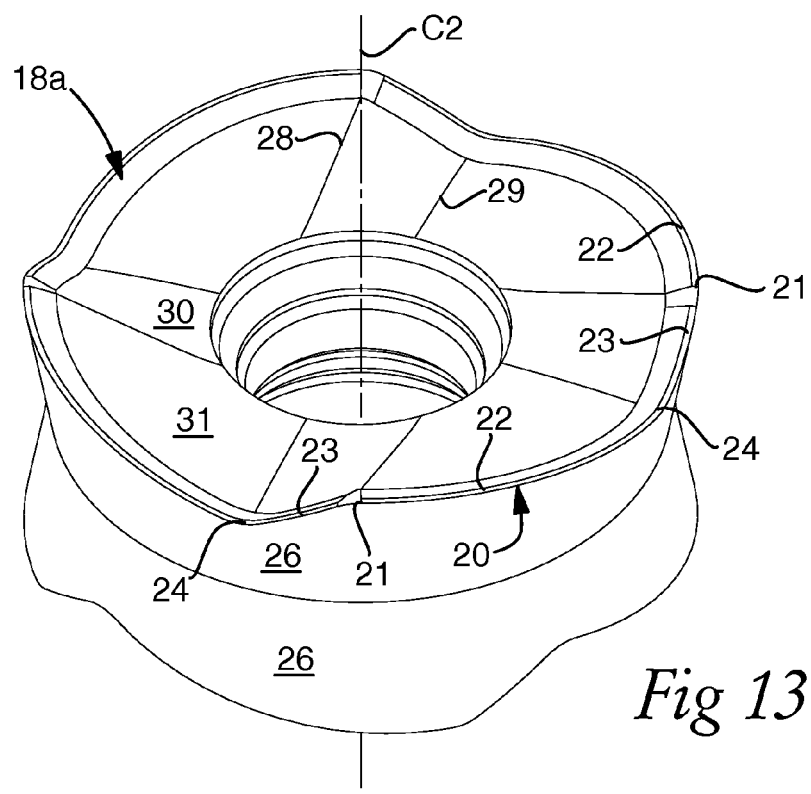
Figure 14:
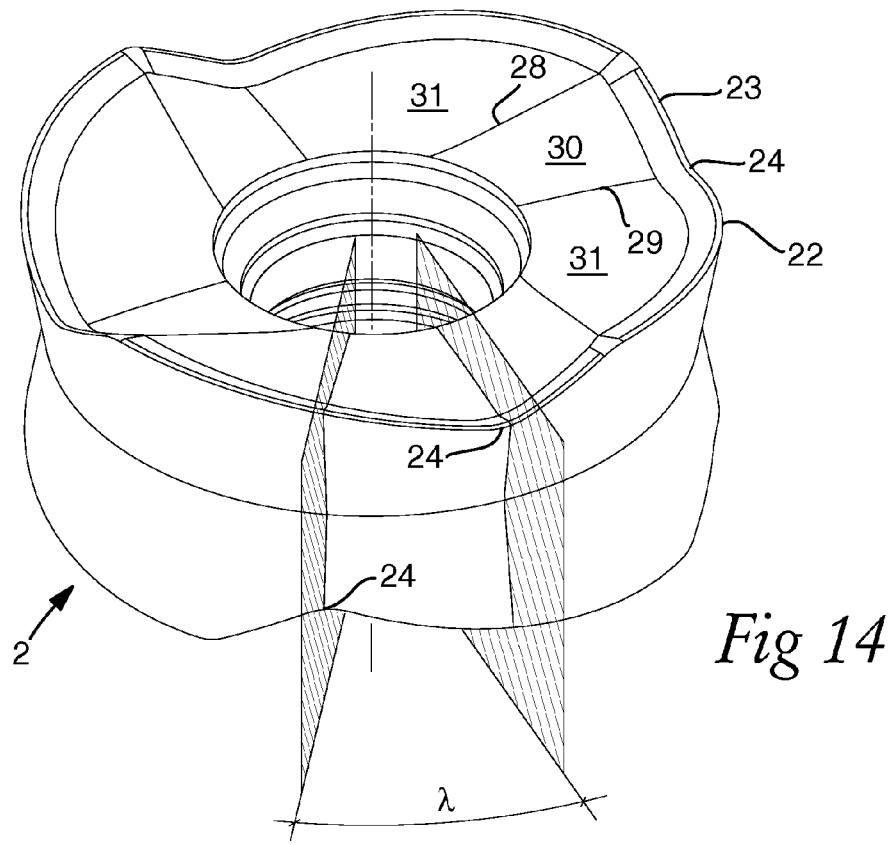
Figure 15:
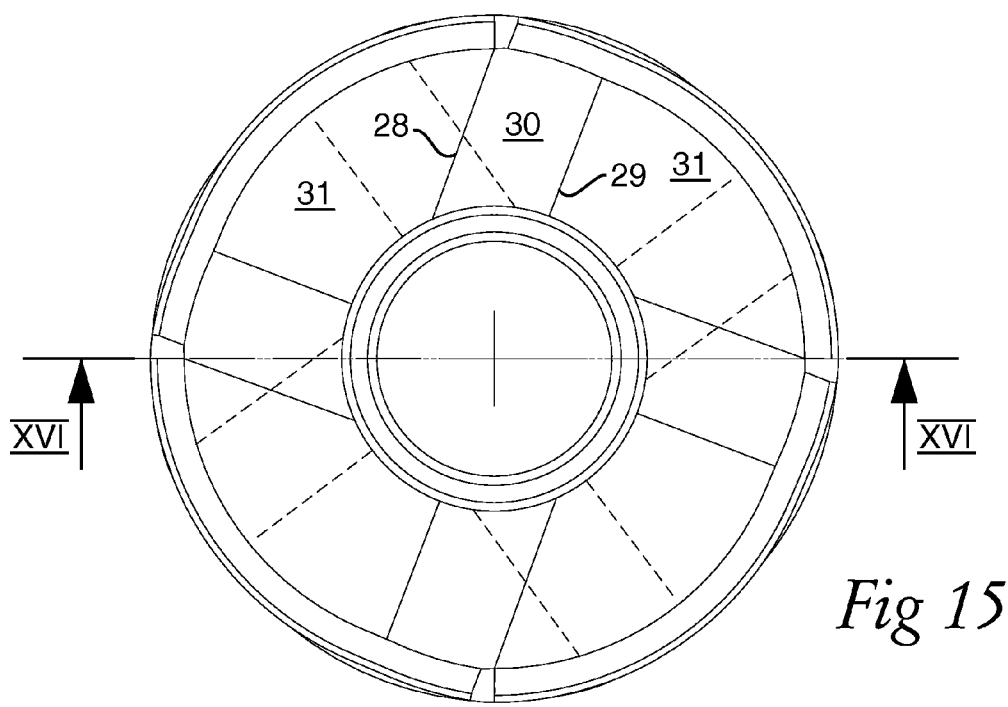
Figure 16:
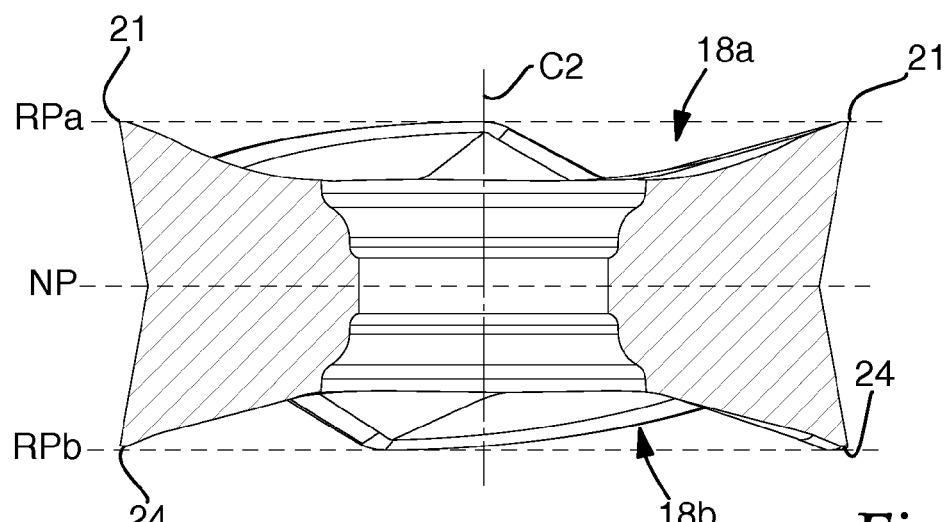
Figure 17:
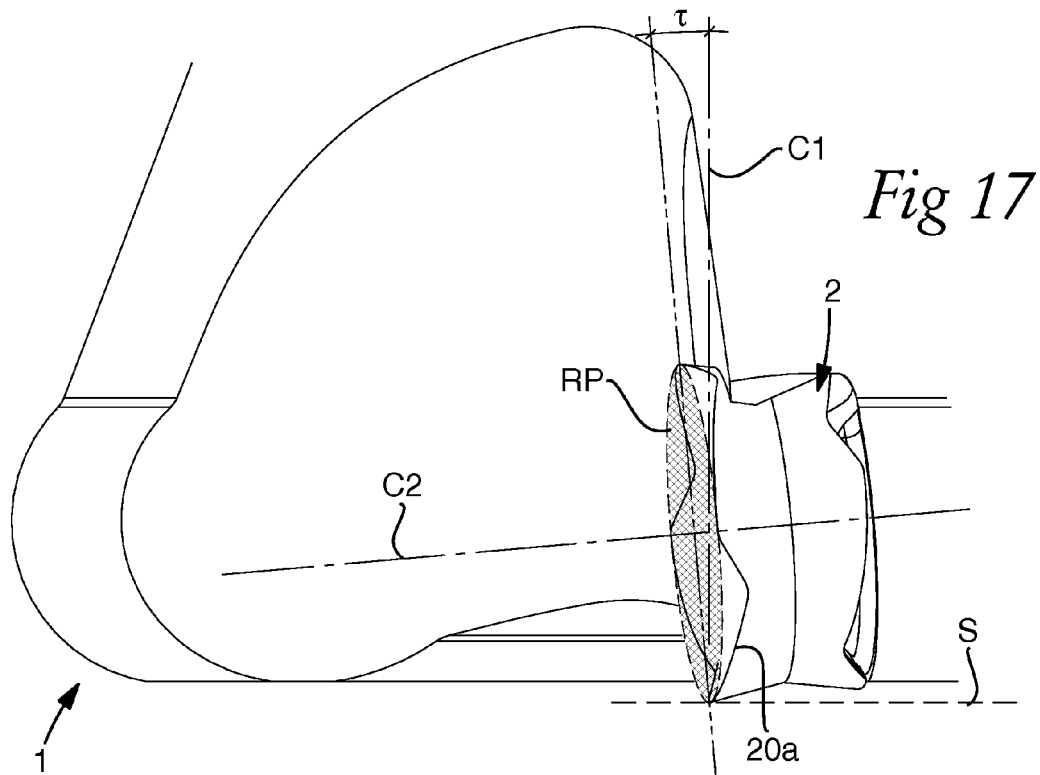
Figure 18:
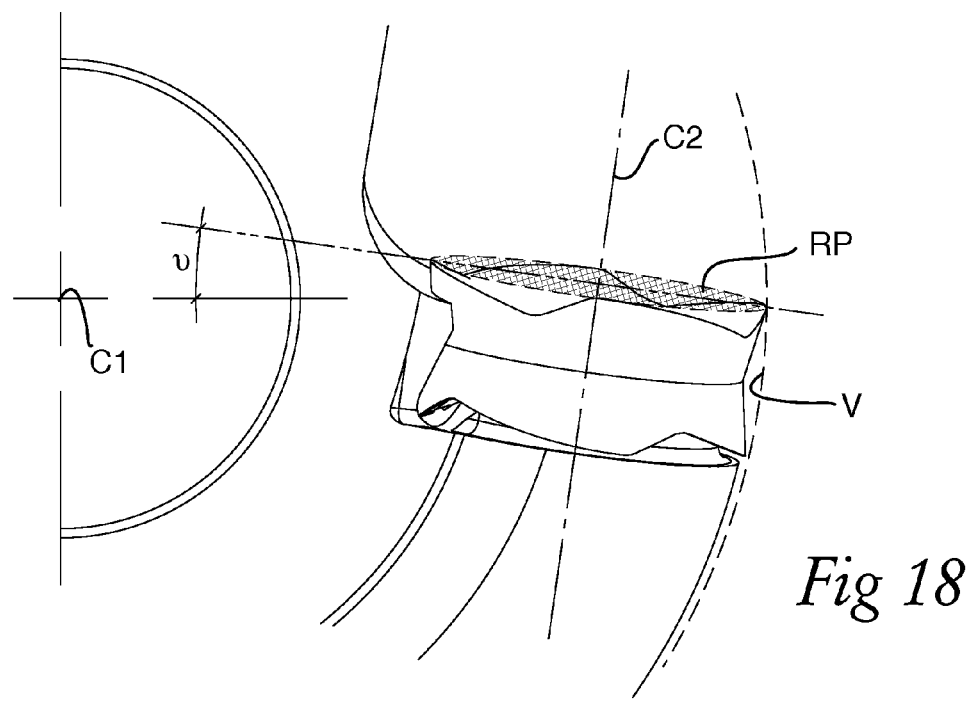
Figure 19:
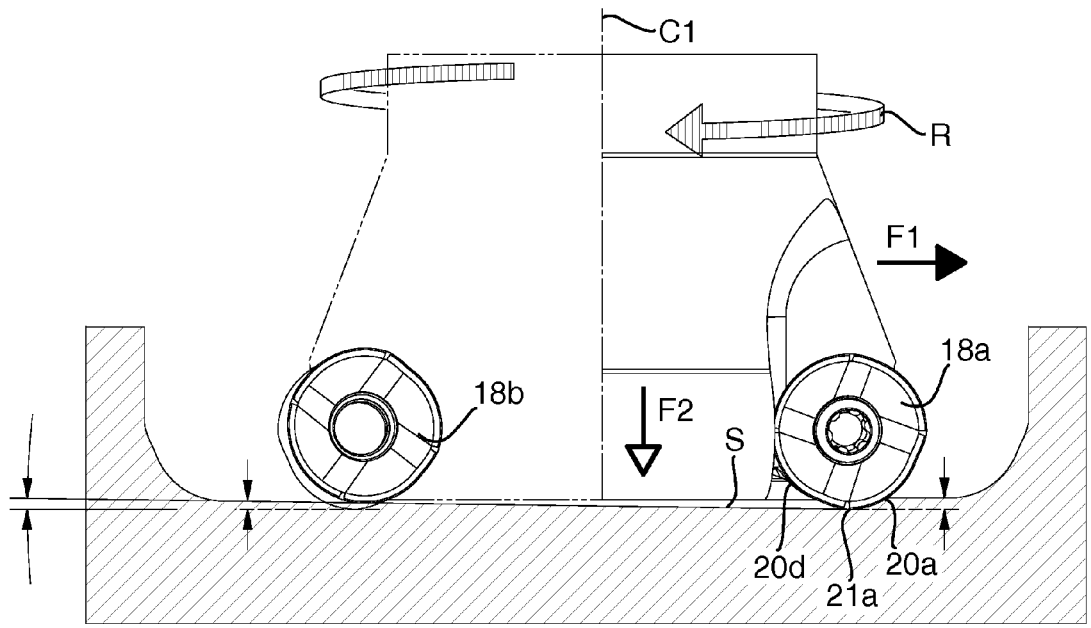
Figure 20:
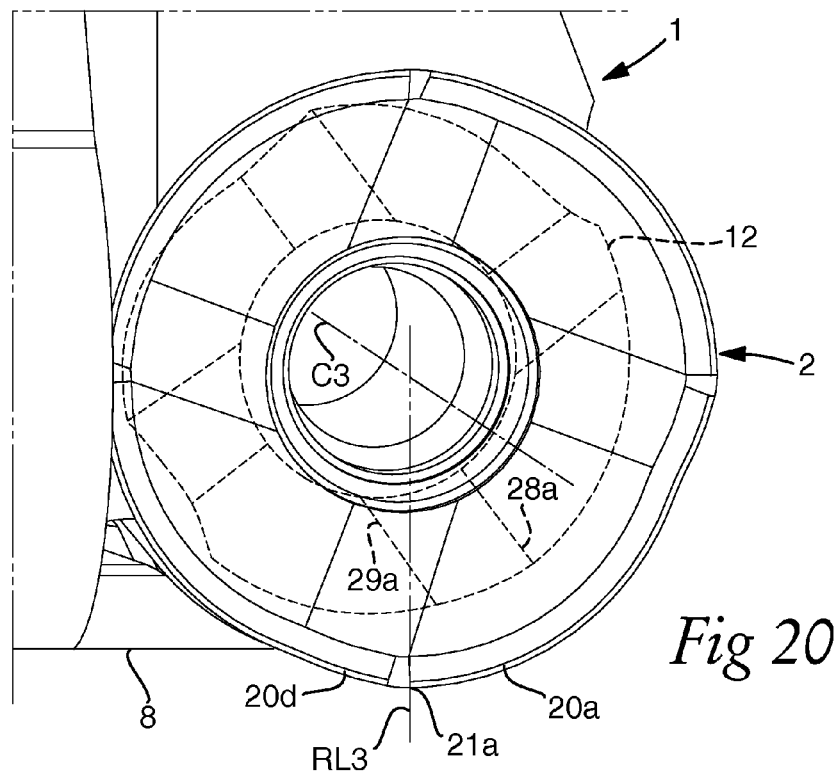

In the drawings:

FIG. 1 is a worm's eye view showing a milling tool according to the invention in an assembled, operative state, FIG. 2 is a perspective exploded view showing a milling insert formed in accordance with the invention and a tightening screw for the same separated from a seat in the basic body or head of the tool, FIG. 3 is a side view of the basic body and the milling insert in the same state as in FIG. 2, FIG. 4 is an end view from the front of the basic body having the milling insert still spaced-apart from the seat, FIG. 5 is an imaginary, geometrical figure having the purpose of facilitating the understanding of the nature of the milling insert, FIG. 6 is a bird's eye view of the milling insert according to the invention, FIG. 7 is a side view of the same milling insert, FIG. 8 is a plan view of the milling insert, FIG. 9 is an enlarged portion of the milling insert according to FIG. 8 in a sector approximately between "three o'clock" and "six o'clock", FIG. 10 is a partly schematic, broken, detailed side view X-X in FIG. 9 showing the wave trough-like or generally concave shape of an individual cutting edge, FIG. 11 is a geometrical figure illustrating the angles of slope of the two edge segments included in the individual cutting edge according to FIG. 10, FIG. 12 is a worm's eye view showing the under side of the milling insert in the form of a downwardly facing chip face, FIG. 13 is a bird's eye view of the milling insert showing the upper side thereof in exactly the same rotation angle position as the one shown in FIG. 12, FIG. 14 is a bird's eye view of the milling insert illustrating how the set of cutting edges along one chip face is displaced in relation to the corresponding set of cutting edges along the opposite chip face, FIG. 15 is a planar view illustrating the same displacement such as this manifests itself in the topographic design of the two chip faces, FIG. 16 is a cross-section XVI-XVI in FIG. 15, FIG. 17 is an enlarged detailed side view showing the functional axial tipping-in position of the milling insert, FIG. 18 is a partial planar view from below showing the radial tipping-in angle of the same milling insert, FIG. 19 is a partly schematic side view illustrating the milling tool during ramping, and FIG. 20 is an enlarged front view showing the position of the milling insert in the mounted state.

DETAILED DESCRIPTION OF A PREFERRED EMBODIMENT OF THE INVENTION

In FIGS. 1-4, there is illustrated a milling tool having a double-sided, indexable milling insert formed in accordance with the invention with a round basic shape. The tool includes a basic body 1 in the form of a so-called milling cutter head as well as a milling insert 2. In the tool, a tightening device 3 in the form of a screw is also included, which has the purpose of clamping the milling insert in a seat 4 in the basic body 1. In practice, the basic body 1 may be manufactured from steel and the milling insert 2 from a harder material, in particular cemented carbide. Also the screw 3 may be manufactured from steel, suitably a steel having a certain inherent elasticity.

The basic body 1 includes front and rear ends 5, 6 (see FIG. 3), between which there extends a centre axis C1 on which the same is rotatable, more precisely in the direction of the arrow R. In other words, the axis C1 is the rotation axis of the tool. A partly conical envelope surface 7 having a rotationally symmetrical basic shape is concentric with the centre axis C1. The front end 5 of the basic body includes a ring-shaped surface 8 (see FIG. 1), which extends perpendicular to the centre axis C1 and inside which, a cup-shaped countersink 9 is formed. In the transition between the envelope surface 7 and the front end 5 of the basic body, a chip pocket 10 is formed having a (rotationally) rear limiting wall 11 in which the seat 4 is countersunk. The seat 4 is formed with a bottom surface 12 (the special design of which will be described in more detail below) as well as with an arched side support surface 13. The bottom surface 12 has the purpose of carrying the tangential cutting forces that act on the milling insert during operation, while the side support surface carries radial and axial forces. When the screw 3 (which by those skilled in the art is designated as "spring biased") is tightened, the same will, by the utilization of the inherent elasticity thereof, press the milling insert not only against the bottom surface 12 of the seat but also against the side support surface 13 thereof.

In the bottom surface 12 of the seat, there mouths a central hole 14 having a female thread 15 in which a male thread 16 of the screw 3 can be tightened, when the screw has been brought through a central, through hole 17 of the milling insert. The centre axis of not only the hole 17 but also the milling insert 2 in its entirety is designated C2, while the corresponding centre axis of the hole 14 is designated C3. The solitary centre axis of the screw 3 is designated C4.

Because the milling insert is double-sided, the seat in which the same is mounted must, as previously pointed out, assume a special tipping-in or spatial position in the basic body 1 for providing the requisite clearance behind the active, chip-removing cutting edge thereof, viz. a tipping-in position, which by those skilled in the art is denominated "negative". This position will be described more in detail when the nature of the milling insert has been made clear, but already in FIGS. 3 and 4, the same is indicated by means of the centre axis C3 of the screw hole 14. Thus, in FIG. 3 it is shown how the centre axis C3 (and also C2 and C4, respectively) runs at an obtuse angle ε in relation to a vertical plane in which the centre axis C1 of the basic body is situated. In the example, ε amounts to 95°. Generally, the bottom surface 12 of the seat extends perpendicular to C3. This means that the bottom surface 12 leans at an axial tipping-in angle of 90°−95°=−5° in relation to the vertical plane coinciding with C1. In an analogous way, the radial tipping-in angle of the bottom surface is also negative. This is seen in FIG. 4, where the negative radial tipping-in angle is designated ζ and in absolute value amounts to 8°.

Below, the design of the milling insert according to the invention will be described in detail, with reference to FIGS. 6-16. First, reference is however made to FIG. 5, which shows an imaginary, geometrical figure having the purpose of facilitating the understanding of the features that characterize the milling insert 2. In FIG. 5, RP designates two identical reference planes, between which there extends a cylinder CY concentric with a centre axis C2 (=the centre axis of the milling insert 2). The two reference planes RP extend perpendicular to the centre axis C2, implying that they are parallel to each other. They are also parallel to a neutral plane NP, from which they are equidistantly spaced apart. In other words, the neutral plane NP is situated halfway between the reference planes RP. The cylinder CY consists of a surface of revolution that is assumed to be generated by a rectilinear generatrix G parallel to the centre axis C2. It should also be pointed out that the reference plane RP shown at the top in FIG. 5 is screened in order to provide a sense of space in the figure. The peripheries of the two reference planes RP are circles that form boundary lines against the cylinder CY.

In FIGS. 6 and 7, two opposite and axially separated ends included in the milling insert are designated 18, which henceforth are denominated "chip faces" and between which a circumferential envelope surface extends, generally designated 19. The topographic shape of the respective chip face 18 is identical and of such a nature that four identical cutting edges, which generally are designated 20, are formed along the periphery of the individual chip face. Each cutting edge extends in its entirety between two end points 21 and includes two segments 22, 23, which transform into each other via a point designated 24.

Characteristic of the milling insert according to the invention is that each individual cutting edge 20 has the shape of a wave trough or concavity lowered in relation to the individual reference plane RP, the edge segment 22 being longer than the edge segment 23 and falls toward the point 24 at a slope angle that is smaller than the slope angle at which the edge segment 23 falls toward the point 24. Henceforth, the edge segment 22 will be denominated "primary" and the edge segment 23 "secondary", besides which the point 24 is denominated "bottom point" because the same is the lowest situated point of the cutting edge in relation to the reference plane RP. Said end points 21 (see FIGS. 7 and also 5) touch not only the individual reference plane RP, but in the example also to the cylinder CY.

With reference to FIGS. 8-11, it should be pointed out that the exemplified milling insert is formed with four cutting edges 20 along each chip face. This means that the individual cutting edge has a total length corresponding to an arc angle δ (see FIG. 8) that amounts to 90°. In this connection, the primary edge segment 22 houses an arc angle designated β, while the corresponding arc angle of the secondary edge segment 23 is designated γ.

In order to allow ramp milling at least moderate depths, the envelope surface 19 of the milling insert, adjacent to at least the secondary edge segment 23, is made with a clearance surface that deviates from the imaginary cylinder CY, more precisely in the direction from said edge segment 23 toward the neutral plane NP. In the shown, preferred embodiment, said clearance surface has been realized by forming the milling insert with a waist 25, which is located in the neutral plane NP and from which circumferential clearance surfaces 26 diverge toward the peripheries of the chip faces. By creating said waist, the two clearance surfaces 26 will extend endlessly along the milling insert and form continuous clearance surfaces along the secondary edge segments 23 as well as the primary ones 22. In the example, the nominal clearance angle σ (see FIG. 7) amounts to 7°. However, this angle may vary, e.g. within the range of 3-12°.

In just FIG. 8, the four cutting edges 20 have been supplemented with the suffixes a, b, c, d to distinguish between the same. In an analogous way, the end points 21 have been provided with the same suffixes. Thus, the cutting edge 20a extends between first and second end points 21a, 21b, the end point 21b forming a first end point of the cutting edge 20b.

In the shown, preferred embodiment, the cutting edges along one chip face 18 are rotation-angularly displaced at an acute arc angle in relation to the cutting edges along the other chip face, more precisely with the purpose further improving the conditions for ramp milling as well as of imparting optimum bulk strength to the milling insert. Thus, by displacing the cutting edges in this way, it is avoided that two bottoms of opposite cutting edges are oriented along the same axial range line; this is something that would weaken the milling insert in this area. By the rotation angle displacement, it is accordingly guaranteed that the thickness of the milling insert is kept as even as possible.

For defining the wave trough-like shape of the individual cutting edge 20, in FIGS. 9-11, two straight reference lines RL1 and RL2 are shown, the first-mentioned one of which extends between the end point 21a and the bottom point 24, while the latter extends between the bottom point 24 and the other end point 21b. With the reference plane RP, the reference line RL1 forms an angle η, while the reference line RL2 leans at an angle θ in relation to RP. These angles η and θ, respectively, depend on the depth of the wave trough (=the axial distance between the reference plane RP and the bottom point 24) as well as on the length of the two edge segments. An increasing depth entails that the angles η, θ increase. The same effect is attained if the length of the edge segments is decreased. In the example, η amounts to 8° and θ to 22°, when the arc angle γ amounts 23° and β to 67° at the same time as the milling insert has an absolute IC-measure of 12 mm. As is seen in FIG. 10, in the example, the primary edge segment 22 has (as viewed in side elevation) a slightly convex arc-shape between the points 21 and 24, while the secondary edge segment 23 has a concave/convex design. The edge line shape of the individual edge segments is, however, incidental, provided that they together form a marked wave trough or concavity that is countersunk in relation to the reference plane RP.

For the sake of completeness, it should be mentioned that the edge segment 22, as well as the edge segment 23, has a convex arc-shape, when the milling insert is regarded in plane elevation (see for instance FIG. 8).

In the embodiment shown, the arc length of the primary edge segment 22 (the arc angle β) amounts to approx. 75% of the total arc length of the cutting edge. This value may vary upward as well as downward. However, the primary edge segment 22 should have an arc length that amounts to at least 60% of the total arc length of the cutting edge. On the other hand, the arc length of the primary edge segment should not be more than 85% of said total length. The depth DE of the wave trough (see FIG. 11), i.e., the axial distance between the bottom point 24 and the reference plane RP, should amount to at least 10% and at most 25% of the total thickness of the milling insert measured between the two reference planes RP.

In each one of the two chip faces 18, there is formed a set of male- and female-like lock members having the purpose of rotationally securing the milling insert in the mounted state thereof. In an advantageous way of manufacturing technique, said lock members have been provided while utilising the wave shape of the cutting edges 20. In the drawings, the lines 28 designate crests, which form male-like members, and the lines 29 chutes or valleys, which form female-like members. On both sides of said crest and chute lines 28, 29, respectively, leaning flank surfaces 30, 31 are present, which form falling surfaces of the crest 28 and rising surfaces of the chute 29, and serve as contact surfaces against the corresponding support surfaces included in co-operating female and male members 28a, 29a of the bottom 12 of the seat 4 (see FIG. 2). Thus, the number of male-like lock members (=the ridges 28) and the number of female-like lock members (=the chutes 29), respectively, correspond to the number of cutting edges, which in this case amounts to four. Generally, the crests 28 run out in the vicinity of the end points 21 of the cutting edges, while the chutes 29 run out toward the bottom points 24. However, the ridges and the chutes, respectively, are not radially directed, but run obliquely in relation to radial planes through said points 21, 24. Thus, the surfaces 12 in the seat 4 and the surface 18 of the milling insert 2 form co-operating connecting surfaces, which—when the screw 3 is tightened— efficiently counteract rotation of the milling insert. With reference to FIGS. 1 and 2, it should be pointed out that the cutting forces acting on the milling insert in the example aim to rotate the same in the direction clockwise on the centre axis C2. This means that the rotational forces primarily are carried by the flank surfaces 30 and 30a, respectively, which are inclined at a greater angle than the flank surfaces 31, 31a. Compare the angles η and θ in FIG. 11.

With reference to FIG. 8, it should furthermore be pointed out that the sets of rotationally securing lock members 28, 29 are separated from the peripheral cutting edge lines of the cutting edges via ring-shaped chip surfaces 32, which form part surfaces of the chip faces 18 in question in their entirety. More precisely, each ring-shaped chip surface 32 is located inside a thin so-called reinforcement bevel 33 and delimited from the inside set of lock members via an arched boundary line 34 having the shape of an endless circle. In the example, the chip surface 32 has an even rake angle along the entire length of the cutting edge, while the contact surfaces 30, 31 lean at other angles than the chip surfaces in relation to the reference plane RP. It should also be mentioned that the four chip surfaces 32 transform into each other via so-called radius transitions 35.

Before the milling insert as such is described further, reference is made to FIG. 19, which schematically shows the tool in question during ramp milling. In order to distinguish the two chip faces 18 of the milling insert, the same have been supplemented with the suffixes a and b. As viewed in the direction of rotation of the tool, the chip face 18a forms a front side and the chip face 18b a back side. In FIG. 19, one and the same milling insert is shown, the one shown to the left being assumed to have rotated half a revolution from the right position. In conventional face milling, when the tool is moved rectilinearly in a plane perpendicular to the rotation axis C1 and more precisely in the direction of the arrow F1, the milling insert 2 will remove chips only along its active cutting edge 20a (cf. FIG. 8). However, radially inside the first end point 21a of the cutting edge 20a, the milling insert clears from the generated surface.

When ramp milling is to be made, in addition an axial feeding motion F2 is applied to the tool, which entails that the tool also moves downward in the material while generating an oblique or ramped surface S. In this connection, the material of the workpiece will—depending on the ramping angle—climb up along at least parts of the secondary edge segment 23 of the inside cutting edge 20d adjacent to the end point 21a. If there would not exist any clearance behind the last-mentioned edge segment, as is the case with conventional cylindrical milling inserts, the envelope surface of the milling insert will collide with the material and make free-cutting machining impossible. In addition, the same risk exists along the envelope surface adjacent to the opposite chip face 18b. Of course, the consequences of such collisions grow worse with increasing ramping angles.

In accordance with a preferred embodiment of the invention, along one chip face, the cutting edges may, as previously mentioned, be rotation-angularly displaced or "displaced in phase" in relation to the cutting edges along the other chip face, more precisely in a special way that minimizes or eliminates the risk of the back side of the milling insert (18b in FIG. 19) colliding with the material of the workpiece during ramp milling. For making this phase displacement clear, reference is made to a concrete tool example, wherein
1) the cutting diameter of the tool amounts to 51 mm
2) the IC-measure of the milling insert (the diameter of the cylinder CY) amounts to 12 mm
3) the thickness of the milling insert amounts to 5.4 mm.

The phase displacement between the cutting edges can be calculated by means of a formula containing parameters, some of which are tool dependent. In FIG. 8, $\lambda$ designates the phase displacement angle between, on one hand, a bottom point 24 along one chip face and a bottom point 24 along the opposite chip face. There exists an optimum angle $\alpha$ for the placement of the ramping recess in the tool. This angle depends on the individual design of the tool, among other things the cutting diameter of the tool, and is measured between on one hand a symmetry plane (in FIG. 8, represented by the straight line that extends between the points 21a and 21c) perpendicular to the neutral plane NP, and on the other hand a radial line that is inserted at random in FIG. 8 and represents the position of the ramping recess in the individual tool. Typical values of a fall in practice within the interval of 30-70°.

The total number of cutting edges per chip face is denominated n, wherein $\delta=360/n$ and $\delta$ is the arc angle. For a given $\alpha$, $\lambda$ can be calculated according to the equation $$\lambda=360/n(1-k)-\alpha$$

wherein $k=\beta/\lambda$
In the concrete tool example, $\alpha=52.5°$ yielding $$\lambda=360/n(1-k)-\alpha=360/4(1-0.75)-\alpha=-30°$$

Within the scope of the invention, n may vary within the interval of 3-6, i.e., each chip face may be formed with all the way from three up to six cutting edges. The factor k should be within the range of 0.6-0.85, preferably within the range of 0.7-0.8 (when $\alpha$ is within the interval of 30-70°.

The phase displacement described above of the angle $\lambda$ is also seen in FIGS. 12-16, wherein the section in FIG. 16 is placed between two diametrically opposed end points 21. On the chip face designated 18a (see also FIG. 19) and facing upward in the figures, the end points 21 of the section XIII-XIII touch the upper reference plane RPa. However, in one and the same section, the two bottom points 24 are—as a consequence of the phase displacement—spaced apart from the lower reference plane RPb.

Most clearly, the phase displacement is seen in FIGS. 12 and 13 in combination with FIG. 14, in which two radial plane cut through the periphery of the milling insert in the bottom points 24 along the two opposite chip faces while forming the aforementioned angle $\lambda$.

In FIG. 15, the ridges 28 and the chutes 29 along the upwardly facing chip face are shown by solid lines, while the corresponding ridges and chutes of the downwardly facing chip face are shown by dashed lines.

Furthermore, reference is made to FIGS. 17 and 18, the first-mentioned one of which illustrates the axially negative tipping-in angle $\tau$ of the milling insert 2 in the basic body 1, while the latter illustrates the radially negative tipping-in angle $\upsilon$. In the figures, one of the two previously described reference planes RP is shown in the form of a screened surface. In FIG. 17, it is seen how the milling insert 2, thanks to the axially negative tipping-in $\tau$, clears the generated plane surface S in the area behind the active cutting edge 20a. In an analogous way, the milling insert 2 clears, thanks to the radially negative tipping-in$\upsilon$, from the arched surface V generated along the periphery of the plane surface S.

A fundamental advantage of the milling insert according to the invention is that the active cutting edge 20a—thanks to its countersunk wave shape—affords a functionally positive cutting angle that guarantees a positive cutting process, during which the same splits and lifts out the chip rather than pushing the same in front of itself. Optimal cutting conditions are obtained when the selected cutting depth is not more than the arc length of the primary edge segment 22, although it is also feasible to use the tool for cutting depths at which also the secondary edge segment 23 is employed.

An important factor for making the milling insert easy-cutting is, of course, the slope angle $\eta$ of the primary edge segment. This angle should be at least 5° greater than the axially negative tipping-in angle $\tau$ of the milling insert 2. Therefore, if the latter amounts to 5°, $\eta$ should amount to at least 10°. In practice, $\eta$ may advantageously amount to at least 15° and at most 30°.

Reference is now made to FIG. 20, wherein RL3 designates a reference line that is parallel to the centre line C1 (see FIG. 19) of the basic body 1 as well as extends perpendicular to a plane in which the front end surface 8 of the basic body extends, the reference line in question intersecting the first end point 21a of the active cutting edge 20a as well as the centre axis C3. In FIG. 20, it is seen that said end point 21a is located in a position "six o'clock" in which the same is the point along the periphery of the milling insert that is axially farthest spaced apart from the front end surface 8 of the basic body. Hence, arbitrary points along the periphery of the milling insert, clockwise as well as counter-clockwise from the point 21a, are situated closer to the plane in which the end surface 8 is situated. In order for the milling insert to always—irrespective of index position—assume said position, the lock members 28a, 29a included in the bottom surface 12 of the seat (shown by dashed lines) form an angle of −30° with the reference line RL3.

In FIG. 20, it is further seen that the bottom surface 12, in which the lock members 28a, 29a are included, has a surface extension (or diameter) that is smaller than the surface extension (or diameter) of the milling insert 2. This means that the milling insert corbels out from the bottom surface along its periphery, the cutting edges along the downwardly facing periphery of the chip face being axially spaced apart a distance from the (plane) surface that surrounds the lock members.

Feasible Modifications of the Invention

The invention is not limited to only the embodiment described above and shown in the drawings. Thus, the milling tool in question may be equipped with an arbitrary number of milling inserts and not only one. Instead of forming the milling insert double-positive, i.e., having circumferential or endless clearance surfaces that diverge from a waist, it is also feasible to form the requisite clearance surfaces only adjacent to the secondary edge segments. Instead of locating the rotationally securing lock means in the chip faces, the same may also be formed in the envelope surface, e.g. adjacent to a possible waist. Instead of exactly screws, also other tightening devices may be a possibility, e.g. clamps. Because the milling insert can be rotationally secured in a reliable way in each individual index position, it is furthermore possible to build in a particular secondary or wiper edge adjacent to the chip-removing cutting edge, more precisely with the purpose of wiping off the generated surface and impart the same with good smoothness. It should also be pointed out that the milling insert may be secured in the appurtenant seat only by contact between the bottom surface of the seat and the lock means in a chip face, i.e., without the assistance of the side support surface shown in the example. It should also be noted that the rake angle of the cutting edge not necessarily has to be equally large along the entire length extension of the cutting edge. Thus, the same may vary, e.g. from a greatest value at the end point of the first edge segment to the second edge segment. In addition, the seat for the milling insert may be formed in a particular shim plate, e.g. of a material that is harder than steel, which is fixed in a desired position in the basic body.

The invention claimed is:

1. A milling tool comprising:
   a basic body having front and rear ends, between which there extends a first centre axis on which the basic body is rotatable and with which an envelope surface is concentric;
   a seat situated in a transition between the envelope surface and the front end; and
   a double-sided, indexable milling insert having a round basic shape defined by an imaginary cylinder that is concentric with a second centre axis, the milling insert extending between two reference planes, which individually extend perpendicular to the second centre axis, wherein the milling insert includes a pair of opposite chip faces that are located in said reference planes and between which an envelope surface concentric with the second centre axis of the milling insert extends, and a plurality of identical and alternately usable cutting edges disposed along the peripheries of the chip faces, wherein the cutting edges along one chip face are rotation-angularly displaced at an acute arc angle in relation to the cutting edges along the other chip face, the seat being located in a spatial position, which is tipped-in in the basic body and in which an axial tipping-in angle and a radial angle are negative thereby providing a clearance behind an active cutting edge of the milling insert, and the milling insert being clamped in the seat by a tightening device and rotationally secured in one of several index positions by co-operating lock means in the basic body and the milling insert, respectively, wherein the individual cutting edge of the milling insert has the shape of a wave trough subsiding from a reference plane when the milling insert is regarded in side elevation, the cutting edge including two edge segments, which transform into each other via a bottom point, a primary edge segment being longer than a secondary edge segment and falling toward the bottom point at a slope angle that is smaller than an analogous slope angle at which the secondary edge segment falls toward the bottom point, and that the slope angle of the primary edge segment is greater than the axially negative tipping-in angle of the milling insert, a clearance surface being included in the envelope surface of the milling insert and located adjacent to at least the second edge segment of the individual cutting edge, the clearance surface deviating from the imaginary cylinder in a direction from said secondary edge segment toward a neutral plane, a waist located in the neutral plane and from which circumferential clearance surfaces diverge toward the peripheries of the chip faces.

2. The milling tool according to claim 1, wherein the primary edge segment of an individual cutting edge has an arc length that is at least 60% of the total arc length of the cutting edge.

3. The milling tool according to claim 1, wherein the primary edge segment of an individual cutting edge has an arc length that is at most 85% of the total arc length of the cutting edge.

4. The milling tool according to claim 1, wherein the rotationally securing lock means are a set of female and male-like lock members included in a bottom in the seat of the basic body.

5. The milling tool according to claim 1, wherein the rotationally securing lock means comprise a set of male- and female-like lock members disposed in the two chip faces of the milling insert.

6. The milling tool according to claim 1, wherein the lock means in the basic body and the milling insert, respectively, are placed in such a way that an active cutting edge of the milling insert is located with an end point maximally axially spaced apart, in the forward direction, from the front end of the basic body.

7. The milling tool according to claim 5, wherein a number of homologous lock members disposed in the individual chip face of the milling insert is equal to the number of cutting edges along the same, and that the shape of the lock members follows the shape of the cutting edges, such that crests serving as male members extend out toward the end points of the cutting edges, while chutes, which serve as female members, extend out toward the bottom points of the cutting edges.

8. A double-sided, indexable milling insert having a round basic shape defined by an imaginary cylinder, which is concentric with a centre axis and extends between two reference planes, which individually extend perpendicular to the centre axis and are equidistantly separated from a neutral plane, the milling insert comprising:
   a pair of opposite chip faces located in said reference planes and between which an envelope surface concentric with the centre axis extends;
   a plurality of identical and alternately usable cutting edges disposed along the peripheries of the chip faces, wherein the cutting edges along one chip face are rotation-angularly displaced at an acute arc angle in relation to the cutting edges along the other chip face;
   lock means for rotationally securing the milling insert in one of several predetermined index positions, wherein an individual cutting edge has the shape of a wave trough subsiding from a reference plane when the milling insert is regarded in side elevation, the cutting edge including two edge segments, which transform into each other via a bottom point, a primary edge segment being longer than a secondary edge segment and falling toward the bottom point at a slope angle that is smaller than an analogous slope angle at which the secondary edge segment falls toward the bottom point;
   a clearance surface included in the envelope surface and located adjacent to at least the secondary edge segment, the clearance surface deviating from the imaginary cylinder in the direction from said secondary edge segment toward the neutral plane: and a waist located in the neutral plane and from which circumferential clearance surfaces diverge toward the peripheries of the chip faces.

9. The milling insert according to claim 8, wherein the primary edge segment of an individual cutting edge has an arc length that is at least 60% of the total arc length of the cutting edge.

10. The milling insert according to claim 8, wherein the primary edge segment of an individual cutting edge has an arc length that is at most 85% of the total arc length of the cutting edge.

11. The milling insert according to claim 8, wherein the rotational-securing means is a set of male- and female-like lock members located in each chip face.

12. The milling insert according to claim 11, wherein a number of homologous lock members of each set is equal to the number of cutting edges along each chip face, and the shape of the lock members follows the shape of the cutting edges, such that crests serving as male members extend out toward the end points of the cutting edges, while chutes, which serve as female members, extend out toward the bottom points of the cutting edges.

* * * * *